United States Patent
Deschaine

(10) Patent No.: US 7,724,727 B1
(45) Date of Patent: May 25, 2010

(54) COMMUNICATING CALLS FROM ANALOG DEVICES USING VOICE OVER PACKET TECHNOLOGY

(75) Inventor: Stephen A. Deschaine, Sunnyvale, TX (US)

(73) Assignee: Cisco Technology, Inc., San Jose, CA (US)

( * ) Notice: Subject to any disclaimer, the term of this patent is extended or adjusted under 35 U.S.C. 154(b) by 1326 days.

(21) Appl. No.: 10/062,843

(22) Filed: Jan. 30, 2002

(51) Int. Cl.
*H04L 12/66* (2006.01)
(52) U.S. Cl. ...................... 370/352; 370/389
(58) Field of Classification Search .......... None
See application file for complete search history.

(56) References Cited

U.S. PATENT DOCUMENTS

| | | | | | |
|---|---|---|---|---|---|
| 6,141,341 | A | * | 10/2000 | Jones et al. | 370/352 |
| 6,404,764 | B1 | * | 6/2002 | Jones et al. | 370/352 |
| 6,826,174 | B1 | * | 11/2004 | Erekson et al. | 370/352 |
| 6,907,031 | B1 | * | 6/2005 | Ehlinger et al. | 370/352 |
| 7,009,961 | B2 | * | 3/2006 | Pietrowicz et al. | 370/352 |
| 2002/0051464 | A1 | * | 5/2002 | Sin et al. | 370/466 |
| 2002/0145999 | A1 | * | 10/2002 | Dzik | 370/352 |

FOREIGN PATENT DOCUMENTS

AU 200054537 B2 6/2000

OTHER PUBLICATIONS

Schulzrinne, et al., "RFC 1889, RTP: A Transport Protocol for Real-Time Application", Jan. 1996, pp. 1-4.*

* cited by examiner

*Primary Examiner*—Jayanti K Patel
*Assistant Examiner*—Jung Park
(74) *Attorney, Agent, or Firm*—Baker Botts L.L.P.

(57) ABSTRACT

Communicating a call from an analog device is disclosed. An analog interface receives analog signals from an analog device, and a receiver receives audio signals. A controller converts the analog signals to first data packets, requests a first communication link according to a voice over packet protocol, and communicates the first data packets across the first communication link according to the voice over packet protocol. The controller converts the audio signals to a plurality of second data packets, requests a second communication link according to the voice over packet protocol, and communicates the second data packets across the second communication link according to the voice over packet protocol.

20 Claims, 4 Drawing Sheets

COMMUNICATING CALLS FROM ANALOG DEVICES USING VOICE OVER PACKET TECHNOLOGY

TECHNICAL FIELD OF THE INVENTION

This invention relates in general to telecommunication devices, and more particularly to communicating calls from analog devices using voice over packet technology.

BACKGROUND OF THE INVENTION

Telecommunications devices use voice over packet technology to transfer voice conversations over a data network. Incorporating analog devices with voice over packet devices in a compact manner, however, may be desired. Consequently, known techniques for communicating calls from analog devices using voice over packet technology may be unsatisfactory for many needs.

SUMMARY OF THE INVENTION

In accordance with the present invention, the disadvantages and problems associated with telecommunications devices have been substantially reduced or eliminated. In particular, communicating calls from analog devices using voice over packet technology is provided.

In accordance with one embodiment of the present invention, communicating a call from an analog device is disclosed. An analog interface receives analog signals from an analog device, and a receiver receives audio signals. A controller converts the analog signals to first data packets, requests a first communication link according to a voice over packet protocol, and communicates the first data packets across the first communication link according to the voice over packet protocol. The controller converts the audio signals to a plurality of second data packets, requests a second communication link according to the voice over packet protocol, and communicates the second data packets across the second communication link according to the voice over packet protocol.

Technical advantages of certain embodiments of the present invention may include providing a telecommunications device that communicates calls from an analog device using voice over packet technology. The analog device and may be readily plugged into the telecommunications device in order to transmit the calls.

Other technical advantages of certain embodiments of the present invention may include providing a controller of a telecommunications device that communicates a call from an analog device. The controller may determine when the analog device is off hook and initiate a call from the analog device. The controller may also cause the analog device to ring, detect when the analog device is off hook, and transmit a call to the analog device. The controller may also transfer a call between the analog device and a headset or handset of the telecommunications device.

Other technical advantages are readily apparent to one skilled in the art from the following figures, descriptions, and claims. Certain embodiments of the present invention may include none, some, or all of the technical advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
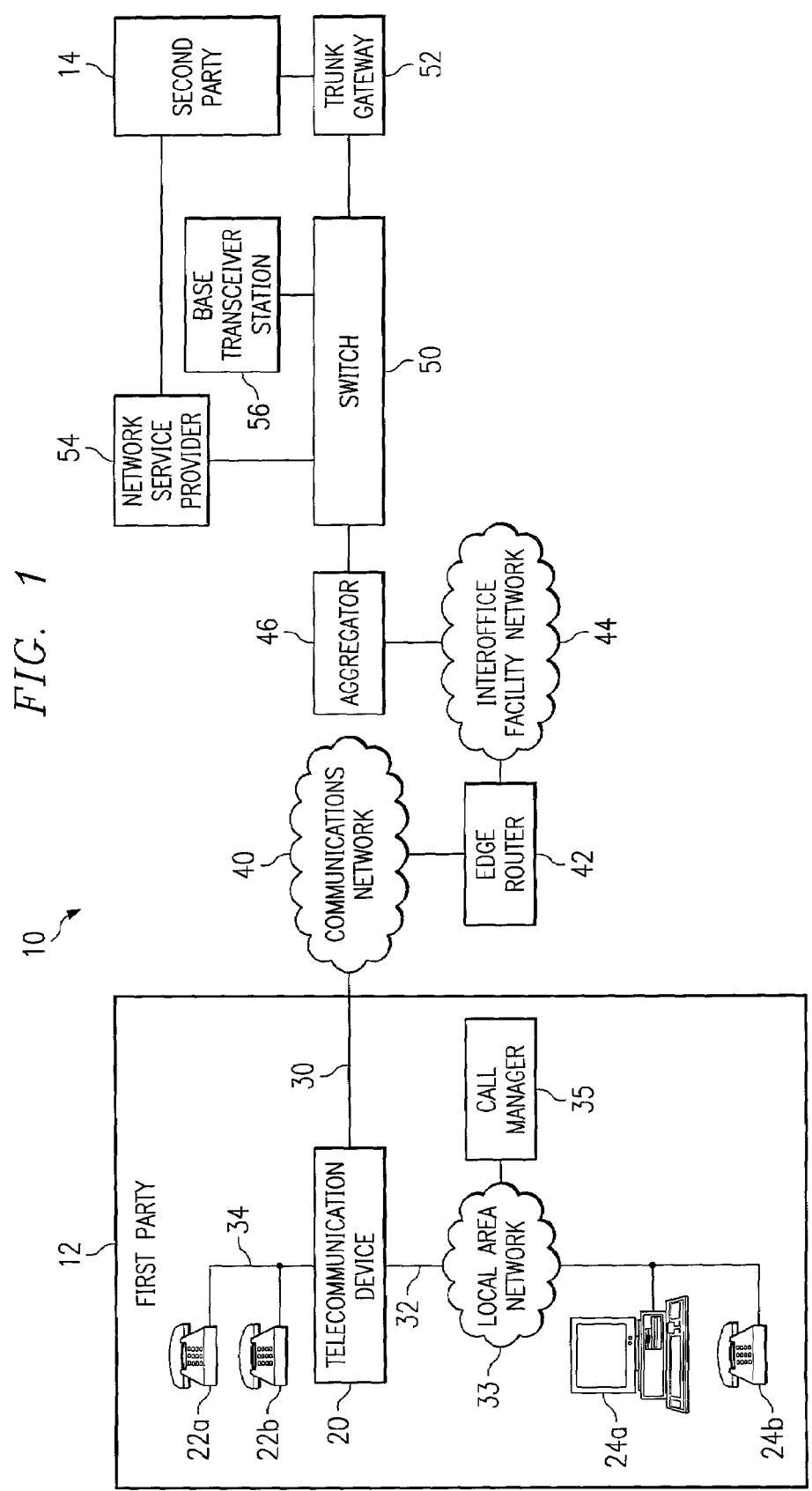
FIG. 1 is a block diagram illustrating a system for communicating signals.

FIG. 1 is a block diagram illustrating a system 10 for communicating signals. Signals comprise an electrical wave used to convey information such as voice or data communication, and may include analog or digital signals. System 10 includes a telecommunications device that communicates calls from analog devices 22 and digital devices 24.

System 10 includes a first party 12 that communicates with a second party 14. A first party 12 includes communication devices such as analog devices 22, digital devices 24, and telecommunications device 20. Analog devices 22 include telecommunications devices that transmit signals using analog transmission. Analog devices 22 may include, for example, telephones, facsimile machines, television monitors, or other suitable device for communicating analog signals. An analog link 34 couples analog devices 22 to telecommunications device 20.

Digital devices 24 digitally record information and transmit the digitally recorded information. Digital devices 24 may include, for example, a computer, a cellular telephone, a television monitor, or other suitable device for communicating digital signals. As used in this document, the term "computer" refers to any suitable device operable to accept input, process the input according to pre-defined roles, and produce output, for example, a personal computer, workstation, network computer, wireless data port, wireless telephone, personal digital assistant, one or more processors for these or other devices, or any other suitable processing device.

A local area network (LAN) link 32 couples digital devices 24 to telecommunications device 20. According to one embodiment, local area network link 32 may couple digital devices 24 through a local area network (LAN) 33. Digital devices 24, however, may be directly coupled to telecommunications device 20. Local area network 33 may comprise, for example, an Internet Protocol (IP) network. Local area network 33, however, may comprise any type of network that allows the transmission of voice and data communication. An Internet Protocol network comprises a packet-switched network that transmits information by placing the information in data packets and sending the data packets individually to the selected destination. Unlike a circuit-switched network, a packet-switched network does not require dedicated bandwidth for the duration of a call. Instead, each communication device sends data packets as they are available for transmission, which makes bandwidth available for other information when is not being transmitted.

A call manager 35 manages digital devices 24 of local area network 33. Call manager 35 comprises an application that controls device configuration, call processing, call routing, phone features such as call hold, call transfer, and caller identification, and other telephony functions of local area network 33.

Telecommunications device 20 communicates calls originating from and directed to analog devices 22 and digital devices 24, and initiates and receives calls using transmitters and receivers integrated with telecommunications device 20. Telecommunications device may include, for example, an integrated handset, headset, and/or speaker phone that may be used to transmit and receive signals.

Telecommunications device 20 may process voice communication using a voice over packet protocol such as Voice over Internet Protocol (VoIP). Voice over Internet Protocol may be used to transmit voice over a data network using the Internet Protocol. Telecommunications device 20 has the capability of encapsulating an input signal such as a voice signal into Internet Protocol data packets so that the voice can be transmitted over an Internet Protocol network. Telecommunications device 20 is described in more detail with respect to FIG. 2.

A wide area network (WAN) link 30 couples telecommunications device 20 to a communications network 40. Communications network 40 may comprise a local exchange network. Communications network 40, however, may comprise any suitable network, such as a public switched telephone network, public/private data network, the Internet, wired or wireless network, or local, regional, or global communication network. An edge router 42 forwards data packets and may also perform tunneling, authentication, filtering, accounting, traffic shaping, and address translation. An interoffice network 44 communicates data packets between switching offices.

An aggregator 46 aggregates data packets received from multiple interoffice facility networks 44. A switch may comprise a layer 2 switch that performs data linked layer operations. Switch 50 determines the source and destination of incoming data packets and sets up a transmission path for the data packets between the source and the destination. Switch may transmit data packets to a trunk gateway 52, a network service provider 54, or a base transceiver station 56 depending upon the destination.

Trunk gateway 52 provides for communication with analog or digital circuit-switched devices of second party 14. Trunk gateway 52 converts data packets to analog or digital circuit-switched data, and vice-versa. Trunk gateway 52 may also perform protocol conversion processes such as translating between a voice over packet call control system protocol and the Signaling System 7 (SS7) protocol. A network service provider 54 comprises a vendor that provides access for second party 14 to a network such as the Internet and the World Wide Web. A base transceiver station 56 includes devices for communicating with wireless devices of second party 14.

Second party 14 communicates with first party 12 through trunk gateway 52, network service provider 54, or base transceiver station 56. Second party 14 may include communications devices that comprise an analog or digital device such as a telephone, facsimile machine, computer, television, or other suitable analog or digital device.

In operation, an analog device 22a of first party 12, may communicate with a communication device of second party 14 such as an analog device that is coupled to trunk gateway 52. Analog device 22a sends an analog signal to telecommunications device 20. Telecommunications device digitizes and encapsulates the analog signal to yield data packets. The data packets are transmitted through communications network 40, edge router 42, interoffice facility network 44, and an aggregator 46 to switch 50. Switch determines that the destination of the packets is an analog device of second party 14, and transmits the data packets to trunk gateway 52. Trunk gateway 52 unpacks the IP packets and converts the data to the appropriate format for transmission to the analog device of second party 14.

Analog device 22a of first party 12 may communicate with other communication devices of second party 14 such as a computer coupled to network service provider 54 or wireless device coupled to base transceiver station 56. Analog device 22a sends an analog signal to telecommunications device 20. Telecommunications device 20 digitizes and encapsulates the analog signal to yield data packets. The data packets are transmitted through communications network 40, edge router 42, interoffice facility network 44, and aggregator 46 to switch 50.

Switch determines the destination of the data packets and transmits the data packets to network service provider 54 if the destination device is an Internet device or to base transceiver station 56 if the destination device is a wireless device. Network service provider 54 or base transceiver station 56 converts the data to the appropriate format for transmission to the communication device of second party 14.

Analog device 22a of first party 12 may communicate with another communication device of first party 12 such as digital device 24b. Analog device 22a sends an analog signal to telecommunications device 20. Controller 84 invokes a bridging function between analog device 22a and digital device 24b. Telecommunications device 20 transmits data to call manager 26 indicating the desired function and destination. Call manager 26 signals analog device 22a and digital device 24b to establish a network connection between themselves over local area network 33. Telecommunications device 20 digitizes and encapsulates analog signals from analog device 22a to yield data packets for transmittal to digital device 24b over local area network 33.

System 10 may perform additional or alternative functions. For example, telecommunications device 20 may communicate a call from digital device 24a to a communication device of second party 14. Additionally, system 10 may have any suitable configuration for communicating calls from analog devices 22 and digital devices 24. For example, call manager 35 may be directly coupled to communications network 40. As another example, call manager 35 with wide area network link 30 may be directly coupled to edge router 42 and then to a public switched telephone network.

Figure 2:
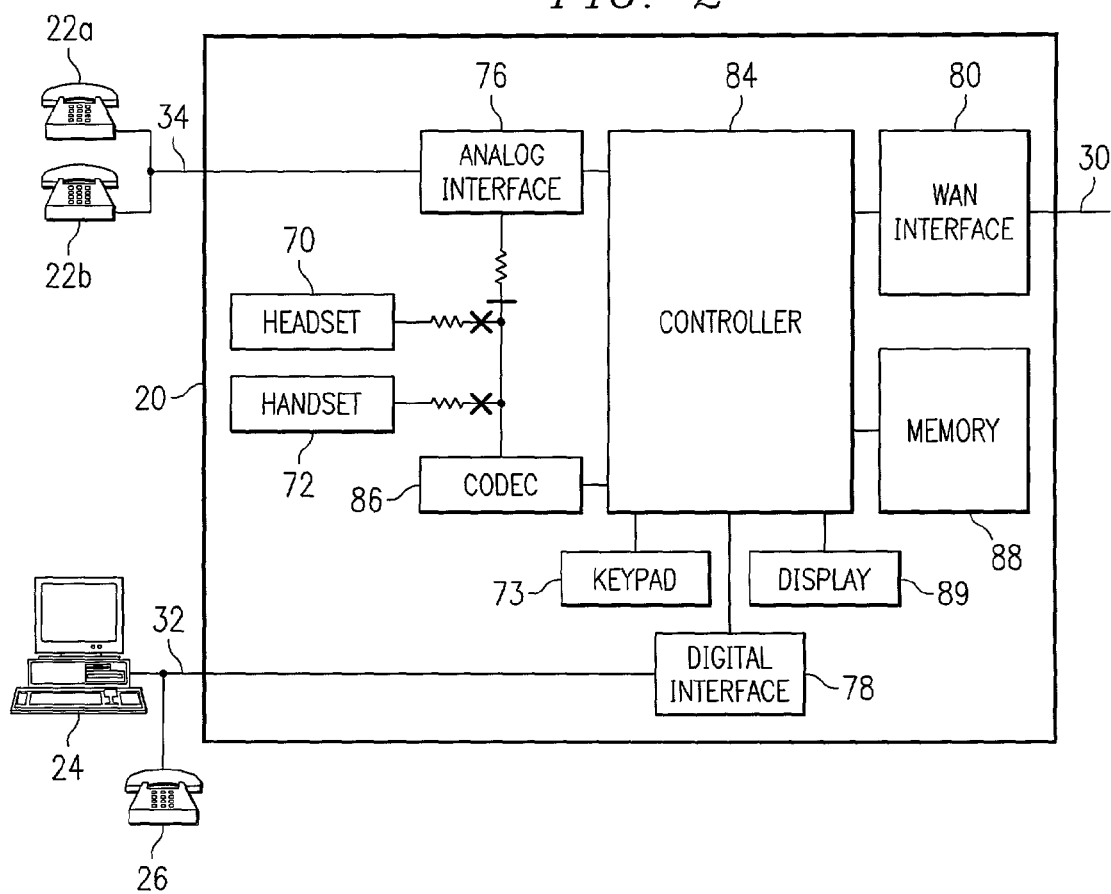
FIG. 2 is a block diagram illustrating an example of a telecommunications device of FIG. 1.

FIG. 2 is a block diagram illustrating an example of telecommunications device 20 of FIG. 1. Telecommunications device 20 includes a headset 70 and a handset 72. Headset 70 comprises a transmitter and receiver assembly worn on the head. Handset 72 comprises a transmitter and receiver assembly held by hand. Although telecommunications device 20 is shown comprising headset 70 and handset 72, telecommunications device 20 may include other or additional configurations of a transmitter and receiver that allows a user to transmit and receive audio signals through telecommunications device 20. Telecommunications device 20 includes a keypad 73, and may also include optional features, for example, special-use buttons such as a speed dial button or a display 89 such as a video, LCD, or other type of display.

Telecommunications device 20 includes interfaces for coupling analog link 34, local area network link 32, and a wide area network (WAN) link 30 to a controller 84. An analog interface 76 communicates signals between analog devices 22 and a controller 84. Analog interface 76 may comprise any electrical, physical, or electromagnetic coupling enabling telecommunication device 20 to be coupled to analog devices 22. One example of analog interface 76 comprises a ringing subscriber line interface circuit by SILVER TELECOM LIMITED such as the AG 1155 or the AG 1250. Any analog interface 76 suitable for communicating signals between analog devices 22 and controller 84, however, may be used.

Digital interface 78 communicates signals between digital devices 24 and controller 84. Digital interface 78 may comprise any electrical, physical, or electromagnetic coupling enabling telecommunication device 20 to be coupled to digital devices 24. One example of digital interface 78 comprises an RJ-45 interface typically used in an Ethernet network. Any digital interface 78 suitable for communicating signals between digital devices 24 and controller 84, however, may be used.

A wide area network (WAN) interface 80 communicates signals between controller 84 and communication network 40. Wide area network interface 80 may comprise any electrical, physical, or electromagnetic coupling enabling telecommunication device 20 to be coupled to communication network 40. One example of wide area network interface 80 comprises a 10/100 interface typically used in an Ethernet network. Any wide area network interface 80 suitable for communicating signals between controller 84 and communication network 40, however, may be used.

A codec (coder/decoder) 86 converts analog signals from analog devices 22, headset 70, and handset 72 to digital signals, and vice versa. Codec 86 may comprise software, hardware, or a combination of the preceding. One example of codec 86 comprises voice codec from SILICON LABORATORIES such as the Si3000 voice codec. Any codec 86 suitable for converting analog signals to digital signals and vice versa, however, may be used.

Controller 84 controls the operation of telecommunications device 20 to communicate calls to and from analog devices 22 and digital devices 24. Controller 84 detects when an analog device 22, a digital device 24, or telecommunications device 20, is off-hook to, for example, request service or receive a call. Controller 84 determines an identifier such as a telephone number for second party 14 that is input into analog device 22, digital device 24, or keypad 73, and sends the identifier to central office 45. Controller 84 also alerts devices of first party 12 of an incoming call and may cause the devices to ring to notify a user of the incoming call. Controller 84 may perform other functions. For example, controller 84 may transfer a call between analog device 22 and headset 70 or handset 72.

Controller 84 may process voice communication according to the voice over packet protocol. Controller 84 encapsulates digitally encoded data within data packets such as Internet Protocol data packets that can be transmitted over Internet Protocol data networks. Encapsulation typically may be performed by Real-time Transport Protocol (RTP) running over User Datagram Protocol/Internet Protocol (UDP/IP).

A memory 88 that stores data is accessible by controller 84. Memory 88 may include any type of volatile or non-volatile computer memory such RAM or its variants, Flash, ROM, PROM, EPROM, EEPROM, or any other appropriate means of storing data. Memory 88 may also include media storage devices including, but not limited to, hard drives, diskettes, CD-ROMs, DVD-ROMs, or other optical or magnetic storage devices. Memory 88 may include operating system software or firmware, such as a real-time operating system (RTOS), that is run by controller 84. An RTOS is an operating system that guarantees a certain capability within a specified time constraint, and is often used in embedded systems. Memory 88 may includes telephony software or firmware that provides the various telephony functions needed to operate telecommunications device 20. Examples of these functions include network interfacing, Internet Protocol tasks, audio processing, button functions, and display functions.

A display 89 may be used to display screens, for example, a touch sensitive keypad that may be used to input a telephone number into telecommunications device 20. Information such as instructions on operating telecommunications device 20, caller identification information, or a directory of telephone numbers may be displayed on display 89.

Although an embodiment of telecommunications device 20 is illustrated, telecommunications device 20 may have any configuration of elements suitable for processing a telephone call from analog device 22. For example, a separate path between analog interface 76 and codec 86 may be provided to allow simultaneous use of analog device 22 and headset 70 or handset 72.

Figure 3:
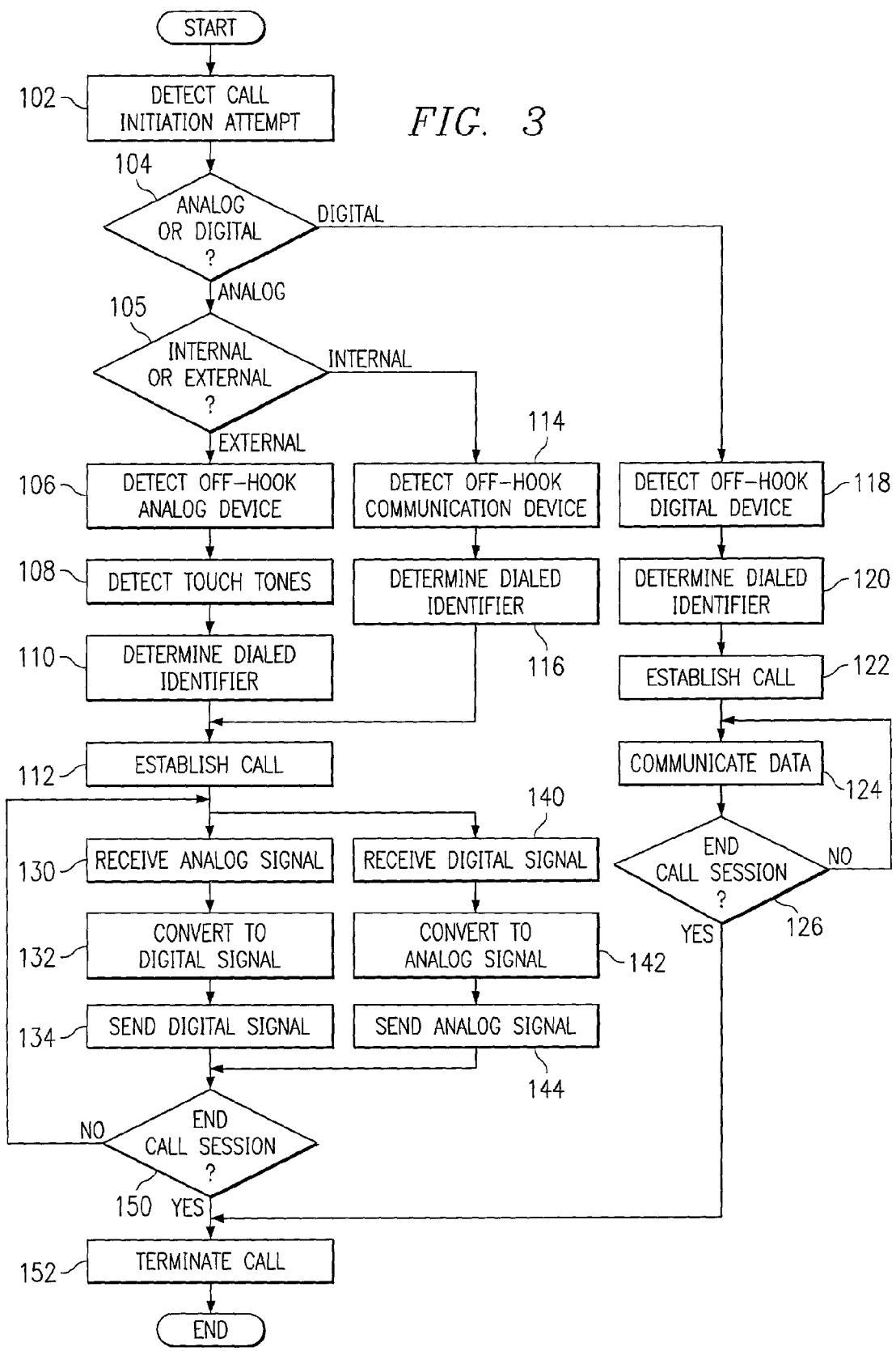
FIG. 3 is a flow chart illustrating an example of a method for processing a call using the telecommunications device of FIG. 1.

FIG. 3 is a flowchart illustrating an example of a method for processing a call using telecommunications device 20 of FIG. 1. The method begins at step 102, where telecommunications device 20 detects a call initiation attempt. The call initiation attempt may be from an analog apparatus, such as analog device 22, handset 70, or handset 72, or a digital device 24 at step 104. If the attempt is from an analog apparatus, the method proceeds to step 105. At step 105, the call initiation attempt may be an external attempt from analog devices 22 or an internal attempt from headset 70 or handset 72.

If the call initiation attempt is an external attempt from analog devices 22 at step 105, the method proceeds to step 106, where controller 84 detects that analog device 22 is off-hook. Controller 84 may detect that analog device 22 is off-hook by receiving a signal through analog interface 76. Controller 84 detects touch tones at step 108. Controller 84 may detect the touch tones by receiving touch tone signals through analog interface 76. Controller 84 determines a dialed identifier of second party 14 from the detected touch tones at step 110. After determining the dialed identifier, the method proceeds to step 112.

If the call initiation attempt is an internal attempt from headset 70 or handset 72 at step 105, the method proceeds to step 114. At step 114, controller 84 detects that telecommunications device 20 is off-hook. Telecommunications device 20 may be off-hook if headset 70 or handset 72 is off-hook. Controller 84 determines a dialed identifier of second party 14 at step 116. The identifier may be entered directly into telecommunications device 20 using keypad 73. After determining the dialed identifier, the method proceeds to step 112.

At step 112, a call between first party 12 and second party 14 is established. The call may be established by sending an invitation to second party 14, alerting second party 14 of the incoming call, and ringing second party 14. A communication link between first party 12 and second party 14 is established in response to second party 14 going off-hook. A call session is activated to establish the call.

Steps 130 through 134 describe converting voice signals to digital signals for transmission from a user, and steps 140 through 144 describe converting digital signals to voice signals for transmission to the user. At step 130, telecommunications device 20 receives an analog signal from analog devices 22, headset 70, or handset 72. Codec 86 converts the analog signal to a digital signal at step 132. The digital signal is sent to wide area network link 30 at step 134. Telecommunication device 20 receives a digital signal from wide area network link 30 at step 140. Codec 86 converts the digital signal to an analog signal at step 142. The analog signal is sent to analog devices 22, headset 70, or handset 72 at step 144.

At step 150, telecommunications device 20 determines whether the call session is to be terminated. The call session may be terminated by first party 12 or second party 14. If the call is not to be terminated, the method returns to steps 130 and 140 to continue processing the call. If the call is to be terminated, the method proceeds to step 152, where telecommunications device 20 terminates the call. After terminating the call, the method terminates.

If the call initiation attempt is from digital device 24 at step 104, the method proceeds to step 118, where controller 84 detects that digital device 24 is off-hook. Controller 84 may detect that digital device 24 is off-hook by receiving a signal through digital interface 78. Controller 84 determines a dialed identifier of second party 14 at step 120. Controller 84 may determine the dialed identifier by receiving signals through digital interface 78. After determining the dialed identifier, the method proceeds to step 122.

At step 122, a call between first party 12 and second party 14 is established. The call may be established by obtaining access to network service provider 54. Network service provider 54 establishes a communication link between first party 12 and second party 14. A call session is activated to establish the call. Data is communicated between first party 12 and second party 14 at step 124.

At step 126, telecommunications device 20 determines whether the call session is to be terminated. The call session may be terminated by first party 12, second party 14, or network service provider 54. If the call is not to be terminated, the method returns to steps 124 to continue processing the call. If the call is to be terminated, the method proceeds to step 152, where telecommunications device 20 terminates the call. After terminating the call, the method terminates.

Figure 4:
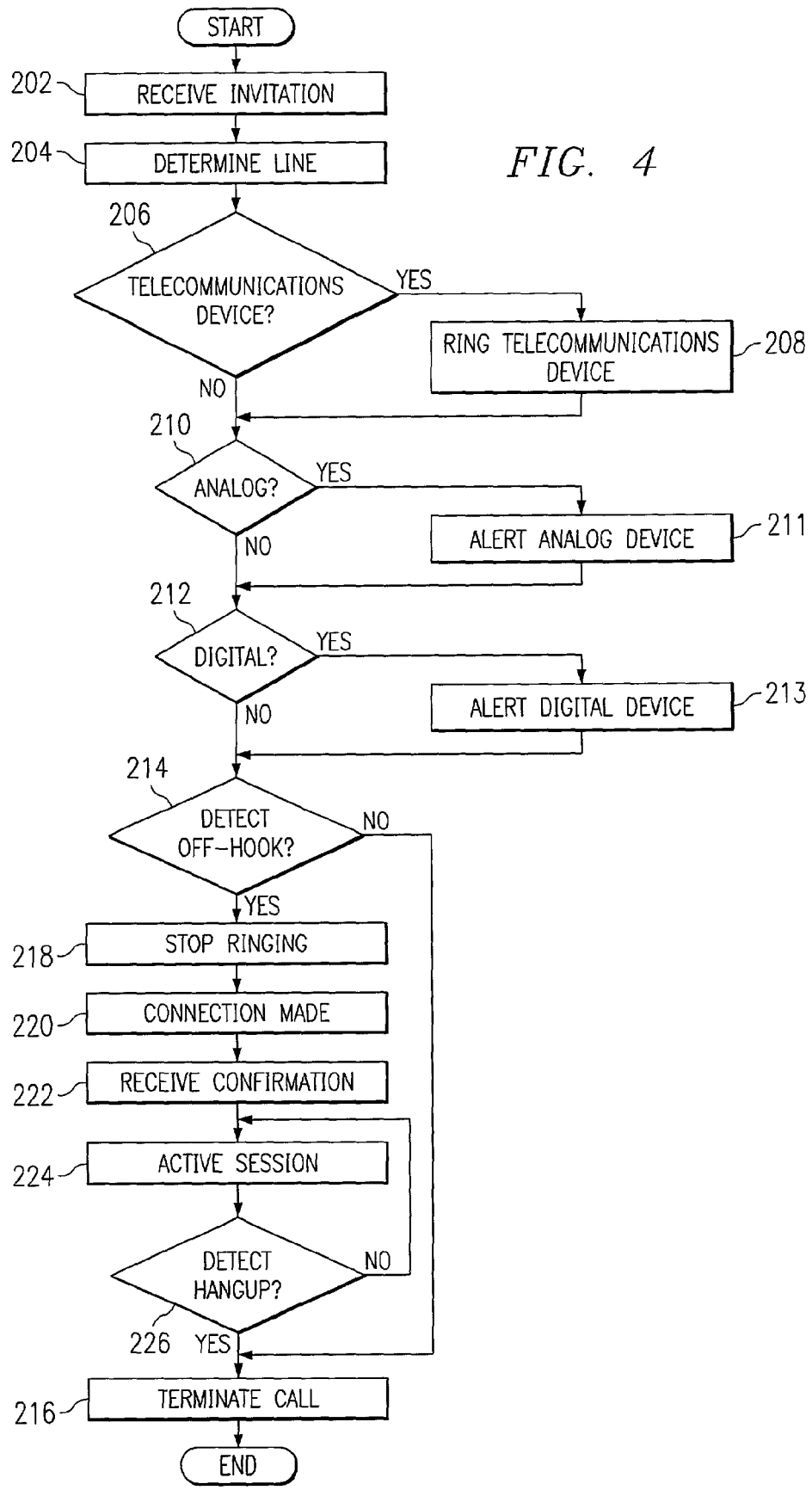
FIG. 4 is a flow chart illustrating an example of a method for receiving a call using the telecommunications device of FIG. 1.

FIG. 4 is a flowchart illustrating an example of a method for receiving a call using telecommunications device 20. The method begins at step 202, where telecommunications device 20 receives an invitation for a call. The invitation includes an identifier of a line of a device of first party 12.

Controller 84 determines the line associated with the identifier at step 204. At step 206, the line may include telecommunications device 20. If the line includes telecommunications device 20, controller 84 rings telecommunications device 20 at step 208. If the line does not include telecommunications device 20, the method proceeds directly to step 210.

At step 210, the line may include an analog device 22. If the line includes an analog device 22, the method proceeds to step 211, where controller 84 alerts analog device 22 and then proceeds to step 212. Controller 84 may alert analog device 22 by sending a message instructing analog device 22 to ring. If the determined line does not include analog device 22, the method proceeds directly to step 212.

At step 212, the line may include a digital device 24. If the line includes digital device 24, the method proceeds to step 213, where controller 84 alerts digital device 24 and proceeds to step 214. Controller 84 may alert digital device 24 by sending a message instructing digital device 24 to ring. If the determined line does not include digital device 24, the method proceeds directly to step 214.

At step 214, controller 84 determines whether a ringing device is off-hook. If a ringing device does not go off-hook, the method proceeds to step 216, where telecommunications device 20 terminates the call. After terminating the call, the method terminates. If controller 84 detects that a ringing device is off-hook, the method proceeds to step 218. At step 218, controller 84 instructs the ringing devices to stop ringing.

A connection is made at step 220. The call is confirmed at step 222, and the session becomes active at step 224. At step 226, controller 84 may detect a hang-up. If there is no hang-up, the method returns to step 224 to continue the active session. If there is a hang-up, the method returns to step 216, where telecommunications device 20 terminates the call.

Technical advantages of certain embodiments of the present invention may include providing a telecommunications device that communicates calls from an analog device using voice over packet technology. The analog device and may be readily plugged into the telecommunications device in order to transmit the calls.

Other technical advantages of certain embodiments of the present invention may include providing a controller of a telecommunications device that communicates a call from an analog device. The controller may determine when the analog device is off hook and initiate a call from the analog device. The controller may also cause the analog device to ring, detect when the analog device is off hook, and transmit a call to the analog device.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A telecommunications device for communicating a call from an analog device, comprising:
   an analog interface operable to receive a first set of analog signals from a remote analog device;
   a receiver operable to receive a plurality of audio speech signals from a user and generate a second set of analog signals based on the audio speech signals; and
   a controller coupled to the analog interface and to the receiver and operable to determine an off-hook state external from the telecommunications device and determine an off-hook state internal to the telecommunications device, the controller further operable to:
   detect an external off-hook state associated with the remote analog device;
   receive a first identifier from the remote analog device;
   in response to detecting the off-hook state associated with the remote analog device and receiving the first identifier, request a first communication link according to a voice over packet protocol based on the first identifier;
   after the first communication link has been established, convert the first set of analog signals to a plurality of first data packets;
   communicate the first data packets across the first communication link according to the voice over packet protocol;
   detect an internal off-hook state associated with the receiver of the telecommunications device;
   receive a second identifier from an input element associated with the receiver;
   in response to detecting the off-hook state associated with the receiver and receiving the second identifier, request a second communication link according to the voice over packet protocol based on the second identifier;
   after the second communication link has been established, convert the second set of analog signals to a plurality of second data packets; and
   communicate the second data packets across the second communication link according to the voice over packet protocol.

2. The telecommunications device of claim 1, further comprising a digital interface coupled to the controller and operable to receive digital signals from a remote digital device, and wherein the controller is further operable to:

detect an off-hook state associated with the remote digital device;
receive a third identifier from the remote digital device;
in response to detecting the off-hook state associated with the remote digital device and receiving the third identifier, request a third communication link according to the voice over packet protocol based on the third identifier;
after the third communication link has been established, convert the digital signals to a plurality of third data packets; and
communicate the third data packets across the third communication link according to the voice over packet protocol.

3. The telecommunications device of claim 1, comprising a transmitter coupled to the controller and operable to:
receive a third set of analog signals from the controller; and
generate a plurality of audio speech signals based on the third set of analog signals.

4. The telecommunications device of claim 1, wherein the controller is operable to encapsulate the data packets according to a Real-time Transport Protocol running over a User Datagram Protocol/Internet Protocol.

5. The telecommunications device of claim 1, comprising a wide area network interface coupled to the controller and operable to communicate the first data packets and the second data packets to a communications network.

6. The telecommunications device of claim 1, comprising a codec operable to:
convert a plurality of analog signals to a plurality of digital signals; and
convert a plurality of digital signals to a plurality of analog signals.

7. A method for communicating a call from an analog device, comprising:
determining an off-hook state external from a telecommunications device and an off-hook state internal to the telecommunications device;
detecting, at the telecommunications device, an external off-hook state associated with a remote analog device;
receiving a first identifier from the remote analog device;
in response to detecting the off-hook state associated with the remote analog device and receiving the first identifier, requesting a first communication link according to a voice over packet protocol based on the first identifier;
receiving, at an analog interface of the telecommunications device, a first set of analog signals from the remote analog device;
after the first communication link has been established, converting the first set of analog signals to a plurality of first data packets using a controller of the telecommunications device;
communicating the first data packets across the first communication link according to the voice over packet protocol;
detecting an internal off-hook state associated with a receiver of the telecommunications device;
receive a second identifier from an input element associated with the receiver;
in response to detecting the off-hook state associated with the receiver and receiving the second identifier, requesting a second communication link according to the voice over packet protocol based on the second identifier;
receiving a plurality of audio speech signals at a receiver of the telecommunications device;
generating a second set of analog signals based on the audio speech signals;
after the second communication link has been established, converting the second set of analog signals to a plurality of second data packets using the controller; and
communicating the second data packets across the second communication link according to the voice over packet protocol.

8. The method of claim 7, further comprising:
detecting, at the telecommunications device, an off-hook state associated with a remote digital device;
receiving a third identifier from the remote digital device;
in response to detecting the off-hook state associated with the remote digital device and receiving the third identifier, requesting a third communication link according to the voice over packet protocol based on the third identifier;
receiving, at a digital interface of the telecommunications device, a plurality of digital signals from the remote digital device;
after the third communication link has been established, converting the digital signals to a plurality of third data packets; and
communicating the third data packets across the third communication link according to the voice over packet protocol.

9. The method of claim 7, further comprising generating, based on a third set of analog signals received by the controller, a plurality of audio speech signals using a transmitter of the telecommunications device.

10. The method of claim 7, further comprising encapsulating the data packets according to a Real-time Transport Protocol running over a User Datagram Protocol/Internet Protocol.

11. The method of claim 7, further comprising communicating the first data packets and the second data packets to a communications network using a wide area network interface of the telecommunications device.

12. The method of claim 7, further comprising:
converting a plurality of analog signals to a plurality of digital signals at a codec of the telecommunications device; and
converting a plurality of digital signals to a plurality of analog signals at the codec of the telecommunications device.

13. Logic for communicating a call from an analog device, the logic embodied in a computer-readable medium and operable to:
determine an off-hook state external from a telecommunications device and an off-hook state internal to the telecommunications device;
detect, at the telecommunications device, an external off-hook state associated with a remote analog device;
receive a first identifier from the remote analog device;
in response to detecting the off-hook state associated with the remote analog device and receiving the first identifier, request a first communication link according to a voice over packet protocol based on the first identifier;
receive, at an analog interface of the telecommunications device, a first set of analog signals from the remote analog device;
after the first communication link has been established, convert the first set of analog signals to a plurality of first data packets;
communicate the first data packets across the first communication link according to the voice over packet protocol;
detect an internal off-hook state associated with a receiver of the telecommunications device;

receive a second identifier from an input element associated with the receiver;
in response to detecting the off-hook state associated with the receiver, determine a second identifier transmitted from an input element associated with the receiver;
request a second communication link according to the voice over packet protocol based on the second identifier;
receive a second set of analog signals from a receiver of the telecommunications device;
after the second communication link has been established, convert the second set of analog signals to a plurality of second data packets; and
communicate the second data packets across the second communication link according to the voice over packet protocol.

14. The logic of claim 13, wherein the logic is operable to:
detect, at the telecommunications device, an off-hook state associated with a remote digital device;
in response to detecting the off-hook state associated with the remote digital device, determine a third identifier transmitted by the remote digital device;
request a third communication link according to the voice over packet protocol based on the third identifier;
receive, at a digital interface of the telecommunications device, a plurality of digital signals from the remote digital device;
after the third communication link has been established, convert the digital signals to a plurality of third data packets; and
communicate the third data packets across the third communication link according to the voice over packet protocol.

15. The logic of claim 13, wherein the logic is operable to transmit a third set of analog signals to a transmitter of the telecommunications device to be used by the transmitter to generate audio speech signals.

16. The logic of claim 13, wherein the logic is operable to encapsulate the data packets according to a Real-time Transport Protocol running over a User Datagram Protocol/Internet Protocol.

17. The logic of claim 13, wherein the logic is operable to communicate the first data packets and the second data packets to a communications network using a wide area network interface of the telecommunications device.

18. The logic of claim 13, wherein the logic is operable to:
convert a plurality of analog signals to a plurality of digital signals at a codec of the telecommunications device; and
convert a plurality of digital signals to a plurality of analog signals at the codec of the telecommunications device.

19. A system for communicating a call from an analog device, comprising:
means for determining an off-hook state external from a telecommunications device and an off-hook state internal to the telecommunications device;
means for detecting, at the telecommunications device, an external off-hook state associated with a remote analog device;
means for receiving a first identifier from the remote analog device;
means for requesting, in response to detecting the off-hook state associated with the remote analog device and receiving the first identifier, a first communication link according to a voice over packet protocol based on the first identifier;
means for receiving, at an analog interface of the telecommunications device, a first set of analog signals from the remote analog device;
means for converting the analog signals to a plurality of first data packets after the first communication link has been established;
means for communicating the first data packets across the first communication link according to the voice over packet protocol;
means for detecting an internal off-hook state associated with a receiver of the telecommunications device;
means for receiving a second identifier from an input element associated with the receiver;
means for requesting, in response to detecting the off-hook state associated with the receiver and receiving the second identifier, a second communication link according to the voice over packet protocol based on the second identifier;
means for receiving a second set of analog signals from a receiver of the telecommunications device;
means for converting the second set of analog audio speech signals to a plurality of second data packets after the second communication link has been established; and
means for communicating the second data packets across the second communication link according to the voice over packet protocol.

20. A telecommunications device for communicating a call from an analog device, comprising:
an analog interface operable to receive a first set of analog signals from a remote analog device;
a digital interface operable to receive a plurality of digital signals from a remote digital device;
a receiver operable to receive a plurality of audio speech signals from a user and generate a second set of analog signals based on the audio speech signals;
a keypad operable to receive an identifier input by the user;
a controller coupled to the analog interface, to the digital device, and to the receiver and operable to:
determine an off-hook state external from the telecommunications device and an off-hook state internal to the telecommunications device;
detect an external off-hook state associated with the remote analog device;
receive a first identifier from the remote analog device;
in response to detecting the off-hook state associated with the remote analog device and receiving the first identifier, request a first communication link according to a voice over packet protocol based on the first identifier;
after the first communication link has been established, convert the first set of analog signals to a plurality of first data packets;
communicate the first data packets across the first communication link according to the voice over packet protocol;
detect an internal off-hook state associated with the receiver of the telecommunications device;
receive a second identifier from the keypad;
in response to detecting the off-hook state associated with the receiver and receiving the second identifier, request a second communication link according to the voice over packet protocol based on the second identifier;
after the second communication link has been established, convert the second set of analog signals to a plurality of second data packets;

communicate the second data packets across the second communication link according to the voice over packet protocol;
detect an off-hook state associated with the remote digital device;
receive a third identifier from the remote digital device;
in response to detecting the off-hook state associated with the remote digital device and receiving the third identifier, request a third communication link according to the voice over packet protocol based on the third identifier;
after the third communication link has been established, convert the digital signals to a plurality of third data packets; and
communicate the third data packets across the third communication link according to the voice over packet protocol, wherein communicating the data packets comprises encapsulating the data packets according to a Real-time Transport Protocol running over a User Datagram Protocol/Internet Protocol; and
a wide area network interface coupled to the controller and operable to communicate the encapsulated data packets to a communications network.

* * * * *